US008847073B2

(12) United States Patent  
Tokunaga et al.

(10) Patent No.: US 8,847,073 B2  
(45) Date of Patent: Sep. 30, 2014

(54) WIRE HARNESS PROTECTOR

(75) Inventors: Hiroaki Tokunaga, Yokkaichi (JP); Takuya Ooba, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 81 days.

(21) Appl. No.: 13/577,031

(22) PCT Filed: Jun. 15, 2011

(86) PCT No.: PCT/JP2011/063646  
§ 371 (c)(1),  
(2), (4) Date: Aug. 3, 2012

(87) PCT Pub. No.: WO2012/098706  
PCT Pub. Date: Jul. 26, 2012

(65) Prior Publication Data  
US 2012/0298404 A1  Nov. 29, 2012

(30) Foreign Application Priority Data  
Jan. 21, 2011  (JP) .................................. 2011-010955

(51) Int. Cl.  
*H02G 3/04* (2006.01)  
*H01B 7/00* (2006.01)  
*H01Q 1/12* (2006.01)  
*H01B 3/10* (2006.01)  
*B60R 16/02* (2006.01)  
*H02G 3/30* (2006.01)

(52) U.S. Cl.  
CPC .......... *B60R 16/0215* (2013.01); *H02G 3/0487* (2013.01); *H02G 3/30* (2013.01)  
USPC ...................... 174/72 A; 174/68.1; 174/72 R

(58) Field of Classification Search  
USPC ....... 174/503, 481, 68.1, 135, 72 A, 72 R, 87, 174/138, 110, 156; 138/106, 108, 110, 112, 138/121; 248/68.1, 74.3, 65  
See application file for complete search history.

(56) References Cited

U.S. PATENT DOCUMENTS 3,295,806 A * 1/1967 Modeme ....................... 248/74.4  
3,711,632 A * 1/1973 Ghirardi ......................... 174/135  
(Continued)

FOREIGN PATENT DOCUMENTS

CA  2213152  2/1999  
FR  1341867  11/1963  
(Continued)

OTHER PUBLICATIONS  
Search report from E.P.O., mail date is May 9, 2014.

*Primary Examiner* — Lisa Lea Edmonds  
*Assistant Examiner* — Rashen E Morrison  
(74) *Attorney, Agent, or Firm* — Greenblum & Bernstein, P.L.C.

(57) ABSTRACT

A protector that accommodates convoluted conduits having different diameters includes a main body and a lid that covers an upper surface opening of the main body. A convoluted conduit engagement portion having ribs that fit troughs of a large-diameter convoluted conduit extends from a bottom wall on one end side in the length direction of the main body to internal surfaces of two side walls. A large-diameter convoluted conduit engagement portion having ribs that fit the troughs of the large-diameter convoluted conduit is provided on an internal surface on one end side in the length direction of the lid, and a small-diameter convoluted conduit engagement portion having ribs that fit troughs of a small-diameter convoluted conduit is provided on an internal surface of the other end side. The lid is rotated by 180 degrees to correspond to an outer diameter of a convoluted conduit and connected to the main body.

6 Claims, 8 Drawing Sheets

(56) References Cited

U.S. PATENT DOCUMENTS

| | | | | |
|---|---|---|---|---|
| 5,401,905 | A * | 3/1995 | Lesser et al. | 174/99 R |
| 5,444,182 | A * | 8/1995 | Hoshino | 439/368 |
| 5,739,470 | A * | 4/1998 | Takeda | 174/97 |
| 6,380,488 | B1 * | 4/2002 | Takeda et al. | 174/135 |
| 6,595,473 | B2 * | 7/2003 | Aoki et al. | 248/74.4 |
| 6,668,865 | B2 * | 12/2003 | Miyamoto et al. | 138/108 |
| 6,677,526 | B2 * | 1/2004 | Kishizawa | 174/68.1 |
| 6,747,209 | B2 * | 6/2004 | Uchida et al. | 174/68.1 |
| 6,861,589 | B2 * | 3/2005 | Katsumata et al. | 174/68.3 |
| 6,968,864 | B2 * | 11/2005 | Miyamoto et al. | 138/110 |
| 7,038,133 | B2 * | 5/2006 | Arai et al. | 174/72 A |
| 7,119,275 | B2 * | 10/2006 | Suzuki et al. | 174/503 |
| 7,581,564 | B2 * | 9/2009 | Tanaka et al. | 138/110 |
| 7,692,095 | B2 * | 4/2010 | Katsumata et al. | 174/72 R |
| 7,709,736 | B2 * | 5/2010 | Irisawa | 174/71 R |
| 8,124,887 | B2 * | 2/2012 | Suzuki | 174/481 |
| 2005/0029005 | A1 | 2/2005 | Arai et al. | |
| 2006/0090916 | A1 | 5/2006 | Suzuki et al. | |

FOREIGN PATENT DOCUMENTS

| | | |
|---|---|---|
| JP | 11-69562 | 3/1999 |
| JP | 2005-137154 | 5/2005 |
| JP | 2006-074844 | 3/2006 |
| JP | 2007-228776 | 9/2007 |

* cited by examiner (A)

(B)

(A)

(B)

(A)

(B)

(A)

(B)

(A)

(B)

(A)

(B)

(A)

(B)

WIRE HARNESS PROTECTOR

TECHNICAL FIELD

The present invention relates to a wire harness protector. More specifically, the present invention enables a protector that positions and holds a front end of a convoluted conduit covering a wire harness to accommodate convoluted conduits having different outer diameters.

BACKGROUND ART

A wire harness routed in a vehicle such as an automobile has an area in which a wiring path needs to be guided and the wire harness needs to be protected to prevent interference with outer members, and this area is inserted into a protector made of a molded resin. Further, at a portion of the wire harness not covered by the protector, the wire harness is inserted into a convoluted conduit having ring-shaped crests and troughs alternating in an axial direction such that the wire harness is bendably, extendably and contractably covered by the convoluted conduit.

When the wire harness covered by the convoluted conduit is continuously covered by the protector, in a case where an area covered by the protector is short or no branch line is branched off from a portion covered by the protector, the wire harness may be inserted into the entire length of the protector without removing the convoluted conduit. Alternatively, in many cases, the front end of the convoluted conduit covering the wire harness is inserted into the protector, and the wire harness is inserted into the protector without the convoluted conduit.

In any case, it is necessary to keep the convoluted conduit in a position inside the protector. Conventionally, as shown in FIG. 8, a plurality of circular arc-shaped ribs 115 are provided in an axial direction protruding from an inner circumferential surface on a front-end opening side of a main body 100 and a lid (not shown) of a protector, the ribs 115 fitting troughs 111 of a convoluted conduit 110. The total number of electric wires configuring a wire harness is different depending on a vehicle's destination or class. Accordingly, an outer diameter of the wire harness differs, and a diameter of the convoluted conduit 110 covering the wire harness also differs. When the size is different, an outer diameter of a trough of a convoluted conduit also differs. In a case where the ribs 115 provided to the protector are for a large-diameter convoluted conduit, the ribs 115 do not fit a diameter of a trough of a small-diameter convoluted conduit, and the convoluted conduit cannot be securely held. Therefore, it is necessary to provide a protector for each size of convoluted conduit, which results in an increase in the number of components and in manufacturing costs.

To address the problem described above, in Japanese Patent Laid-Open Publication No. 2006-74844, the inventors of the present invention have suggested a protector that can accommodate convoluted conduits having different sizes, large and small. In the protector shown in FIGS. 9 and 10, while a main body 101 of a protector 100 is used for both, a large-diameter lid 102A and a small-diameter lid 102B are provided as lids. Ribs 104 protruding from an internal surface of the main body 101 and engaging with troughs of a convoluted conduit are configured to fit a large-diameter convoluted conduit CT-L. Ribs provided to the large-diameter lid 102A are configured to fit the large-diameter convoluted conduit. Ribs provided to the small-diameter lid 102B are configured to fit a small-diameter convoluted conduit CT-S.

CITATION LIST

Patent Literature

Patent Literature 1: Japanese Patent Laid-Open Publication No. 2006-74844

SUMMARY OF INVENTION

Technical Problem

In the protector shown in FIGS. 9 and 10, one main body 101 can be used for both, but a lid is needed for each size of convoluted conduit. Thus, when there are two sizes of convoluted conduit, two types of lid are needed. When there are four sizes of convoluted conduit, four types of lid are needed. Accordingly, only the main body can be used for all and a lid needs to be prepared for each size. Thus, it is desirable that a lid can be used as much as possible regardless of the size of a convoluted conduit.

The present invention has been devised to address the above-described problem. Objects of the present invention are to use one protector lid as much as possible regardless of the size of a convoluted conduit to be covered and kept in a position, to reduce the number of components, and to reduce manufacturing costs accordingly.

Solution to Problem

In order to solve the problem described above, the present invention provides a protector that positions and holds on an insertion inlet side a convoluted conduit covering a wire harness and that includes a main body having a bottom wall and two side walls, and a lid provided separately from the main body and covering an upper surface opening of the main body. Locks capable of mutually connecting the main body and the lid are provided on both sides in a length direction of each of the main body and the lid, and the locks of the lid are provided in symmetrical positions to enable connection with the locks of the main body even when the lid is rotated by 180 degrees. A convoluted conduit engagement portion having ribs that fit troughs of a large-diameter convoluted conduit extends from the bottom wall on one end side in the length direction of the main body to internal surfaces of the two side walls. A large-diameter convoluted conduit engagement portion having ribs that fit the troughs of the large-diameter convoluted conduit is provided on an internal surface on one end side in the length direction of the lid, and a small-diameter convoluted conduit engagement portion having ribs that fit troughs of a small-diameter convoluted conduit is provided on an internal surface on the other end side. The convoluted conduit engagement portions on both the main body side and the lid side include a plurality of ribs having the same pitch and allow the lid to be rotated by 180 degrees to correspond to an outer diameter of an inserted convoluted conduit and to connect to the main body.

The ribs for the large-diameter convoluted conduit protrude in a circular arc shape, the circular arc of the ribs having a larger outer diameter as well as a smaller rib protrusion amount. On the other hand, the circular arc of the ribs for the small-diameter convoluted conduit has a smaller outer diameter as well as a greater rib protrusion amount. A pitch for troughs and crests of convoluted conduits is generally the same regardless of an outer diameter thereof. Therefore, when a diameter and a height of ribs are different as described above, it is possible for the ribs to precisely fit different sizes of convoluted conduit, both large and small diameter convoluted conduits.

As described above, similar to Patent Literature 1, the main body of the protector includes protruding ribs that fit the troughs of the large-diameter convoluted conduit. On the other hand, the lid includes the ribs for the large-diameter convoluted conduit protruding on one end side in the length direction and the ribs for the small-diameter convoluted conduit protruding on the other end side in the length direction. Thus, in a case where a convoluted conduit covering a wire harness and inserted into one end side of the protector is large-diameter convoluted conduit, the ribs for a large-diameter convoluted conduit provided on the lid are positioned facing the side of the main body where the ribs for engagement with the convoluted conduit protrude. Accordingly, the ribs of the main body are inserted into a lower half circumference of the troughs at the end of the large-diameter convoluted conduit that is inserted from an opening at one end of the protector. Further, the ribs on the lid are inserted into an upper half circumference of the troughs of the large-diameter convoluted conduit. Thereby, the large-diameter convoluted conduit is positioned and held inside the protector. On the other hand, in a case were a small-diameter convoluted conduit covers a wire harness, the ribs for a small-diameter convoluted conduit provided on the lid are positioned facing the side at the main body where the ribs for engagement with the convoluted conduit protrude. Accordingly, the ribs of the main body are inserted into a central portion of the lower half circumference of the troughs at the end of the small-diameter convoluted conduit that is inserted from an opening at one end of the protector, while the ribs of the lid are precisely inserted into the upper half circumference of the toughs. Thereby, the small-diameter convoluted conduit is positioned and held inside the protector. Therefore, when there are two different sizes, the lid can be used for both the sizes, and thus only one type of protector needs to be provided. In a case where there are four different sizes, only one main body and two types of lid are needed, which results in a great reduction in the number of components.

The wire harness covered by the protector of the present invention is inserted through the convoluted conduit on one end side of the protector while the wire harness on the other end side is bound by a band clip without being inserted through the convoluted conduit. A recess for the band clip is provided to the bottom wall of the main body of the protector. A clip latching hole is provided in the center of the recess.

As described above, the convoluted conduit covering the wire harness is a portion of several pitches from one end side of the protector, specifically the inlet. This portion of the convoluted conduit inserted into the protector is positioned and held by the ribs of the main body and of the lid. In a portion from the other end side of the protector, specifically the outlet, to at least the central position in the length direction of the protector, the wire harness inserted into the protector does not go through the convoluted conduit. Since a plurality of wires are separated from one another, they are bound by a band of the band clip wrapping around the wires. A latching clip integrally provided with the band is inserted and latched in the clip latching hole provided to the bottom wall of the main body of the protector. Thereby, it becomes possible to bind the wire harness pulled out from the outlet on the other end side of the protector. Further, when the wires of the wire harness are bound by the band clip, by engaging a main body of a band latching portion with the recess for the band clip, it becomes possible to prevent the wire harness bound by the band clip from protruding to the lid side, which enables the lid to lock and connect to the main body without difficulty.

Moreover, in the protector of the present invention, a dividing wall is provided in the length direction in the middle of a width direction of the main body. A wire harness insertion path is provided on one side divided by the dividing wall. The ribs are provided on the internal surface on one end side of the wire harness insertion path to define the convoluted conduit engagement portion. A splice housing is provided on the other side of the dividing wall. A width of the lid corresponds to a width of the main body. The large-diameter convoluted conduit engagement portion and the small-diameter convoluted conduit engagement portion may be diagonally positioned.

As described above, in a case where the wire harness inserted into the protector has a splice, a branch line having the splice is branched off before being inserted into the protector. The splice is housed in the splice housing provided in the protector. Accordingly, because the width of the main body is increased, the width of the lid that locks and connects to the main body is also increased. The ribs for the large-diameter convoluted conduit and the ribs for the small-diameter convoluted conduit are diagonally positioned. Thereby, the lid side ribs are placed in an upper surface position opposite to the ribs of the main body in a state where the lid is rotated by 180 degrees.

Advantageous Effects of Invention

As described above, a protector according to the present invention is provided with ribs that latch onto a large-diameter convoluted conduit on one side in a length direction of a lid provided separately from a main body, and ribs that latch onto a small-diameter convoluted conduit on the other side. Therefore, by merely rotating the lid by 180 degrees, it becomes possible even for one protector main body and one protector lid to accommodate convoluted conduits having two different diameters. Accordingly, since one protector can accommodate convoluted conduits having different sizes, it is possible to greatly reduce the number of components as well as manufacturing costs.

DESCRIPTION OF EMBODIMENTS

Figure 1:
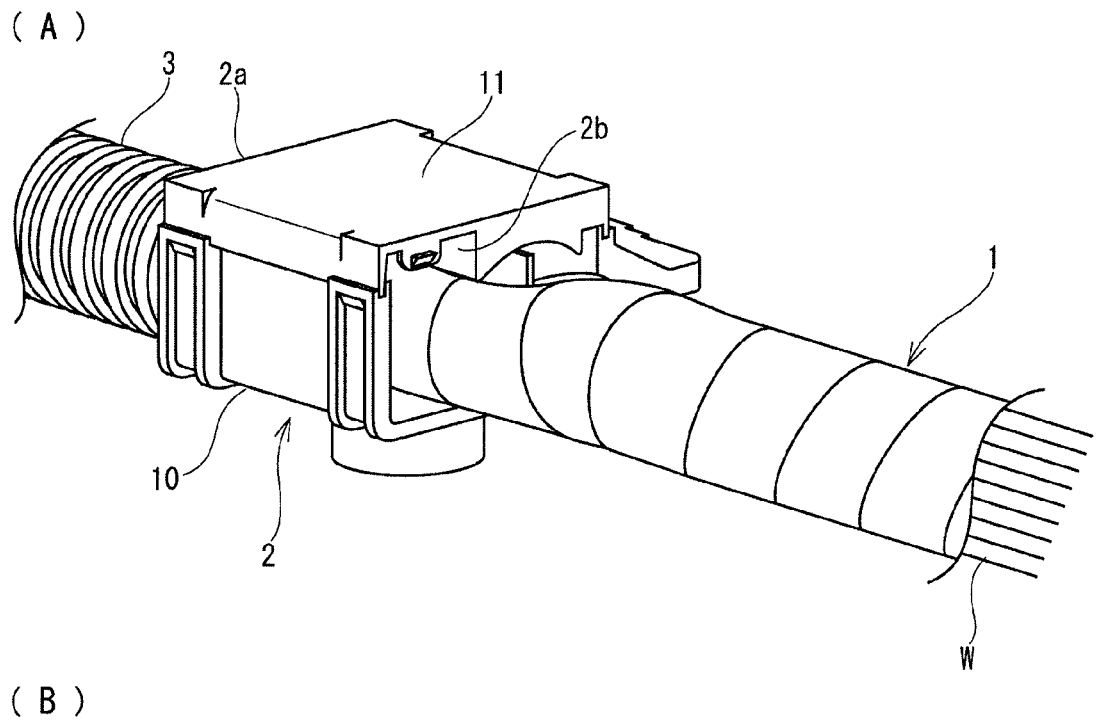
[FIG. 1] Figures showing a first embodiment of the present invention. (A) A perspective view of a state in which a wire harness is inserted between a main body and a lid of a protector. (B) A perspective view of a state in which the lid in (A) is removed.
Figure 1:
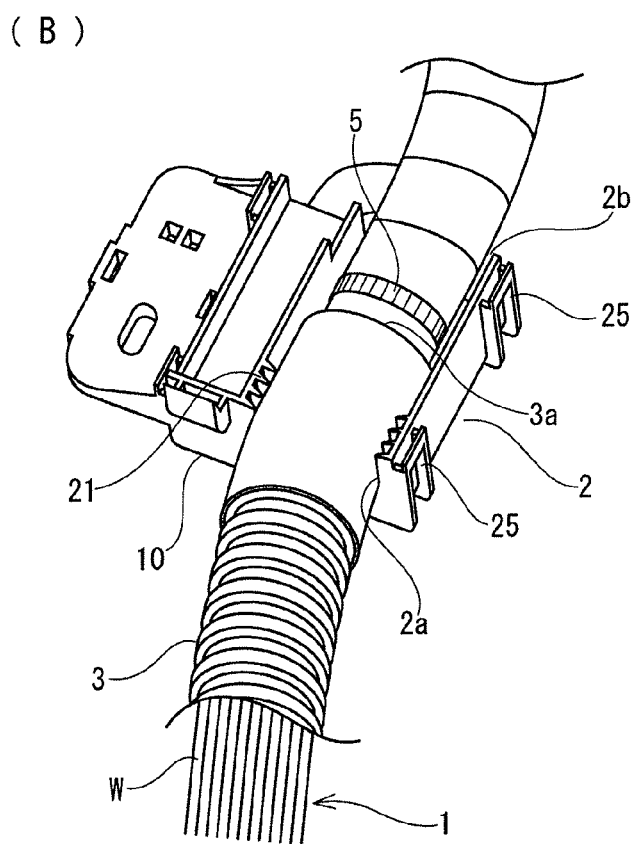

Hereinafter, embodiments of the present invention are described with reference to the drawings. FIGS. 1 to 6 illustrate a first embodiment. A predetermined area of a wire harness 1 routed in an automobile is inserted through a protector 2 formed of molded resin. The wire harness 1 inserted into an inlet 2a, which is an opening at one end side in a length direction of the protector 2, runs through a convoluted conduit 3 (a large-diameter convoluted conduit 3L or a small-diameter convoluted conduit 3S shown in FIG. 6). A front end 3a of the convoluted conduit 3 internally engages and latches onto the protector 2 on the inlet 2a side. In the interior of the protector 2, the wire harness 1 is pulled out from the front end 3a of the convoluted conduit. The wire harness 1 is bound by a band clip 5 at a position between a central position in the length direction of the protector 2 and an outlet 2b, which is an opening on the other end side. The wire harness 1 is pulled out from the outlet 2b.

Figure 2:
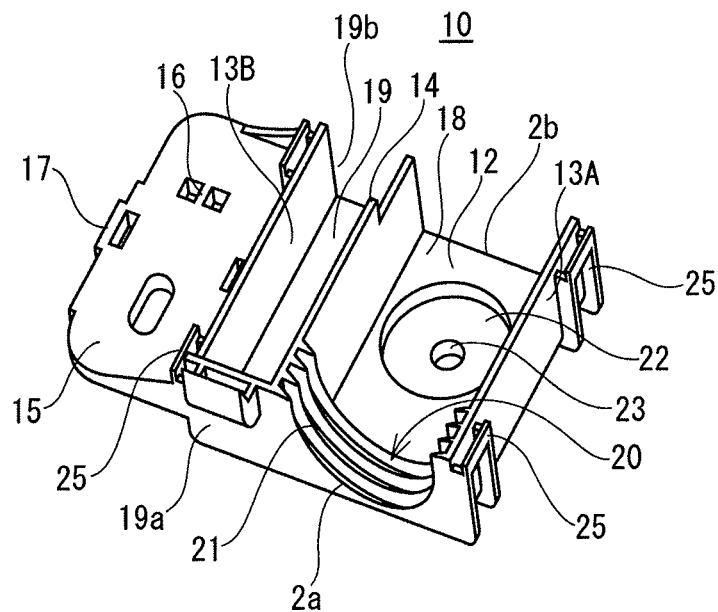
[FIG. 2] Figures showing the protector. (A) A perspective view showing the main body from above. (B) A perspective view showing the lid from below.
Figure 2:
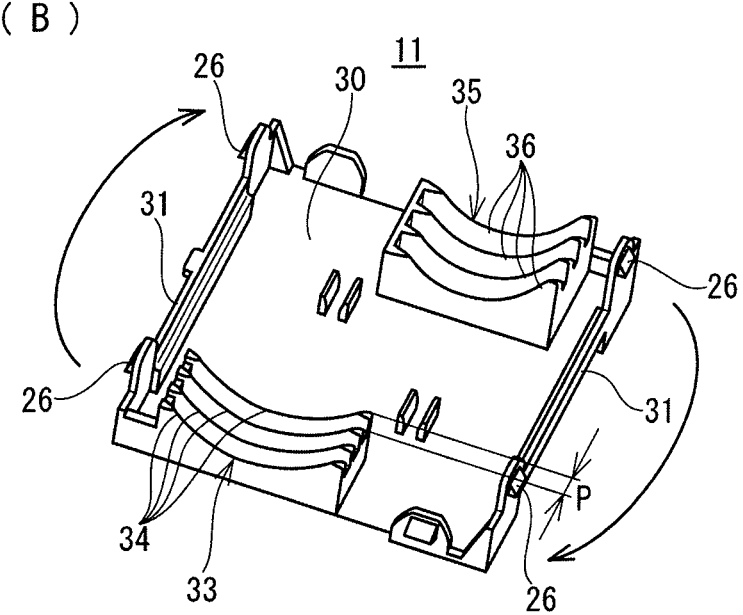
Figure 3:
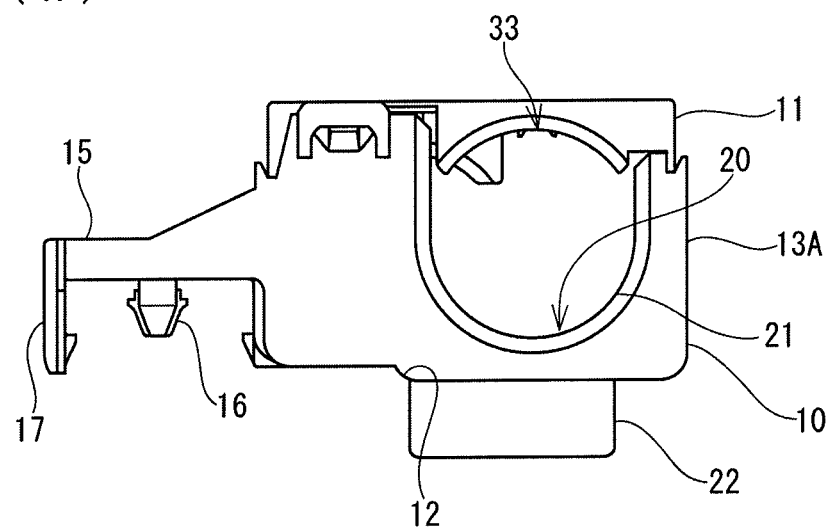
[FIG. 3] Figures showing a state in which the main body and the lid of the protector are assembled. (A) A left side view. (B) A right side view.
Figure 3:
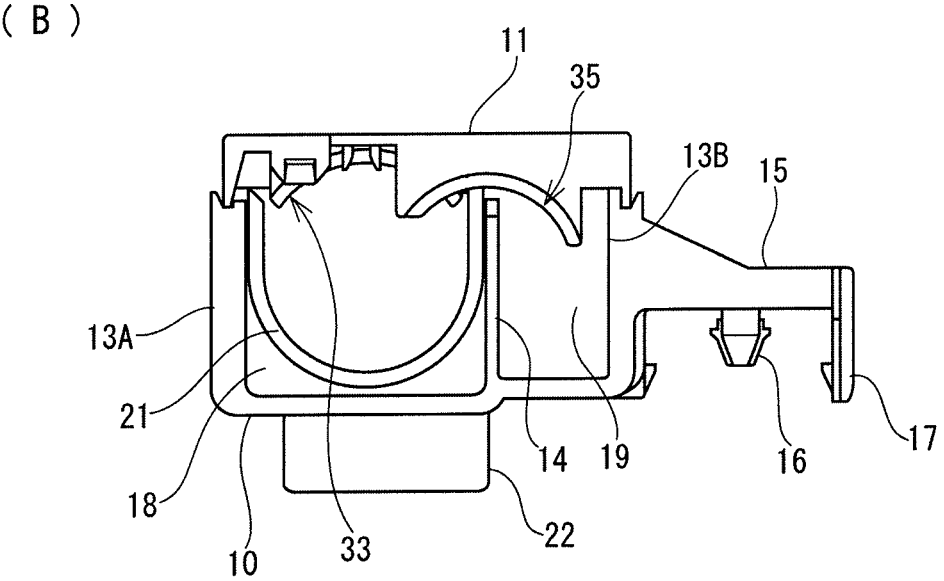
Figure 4:
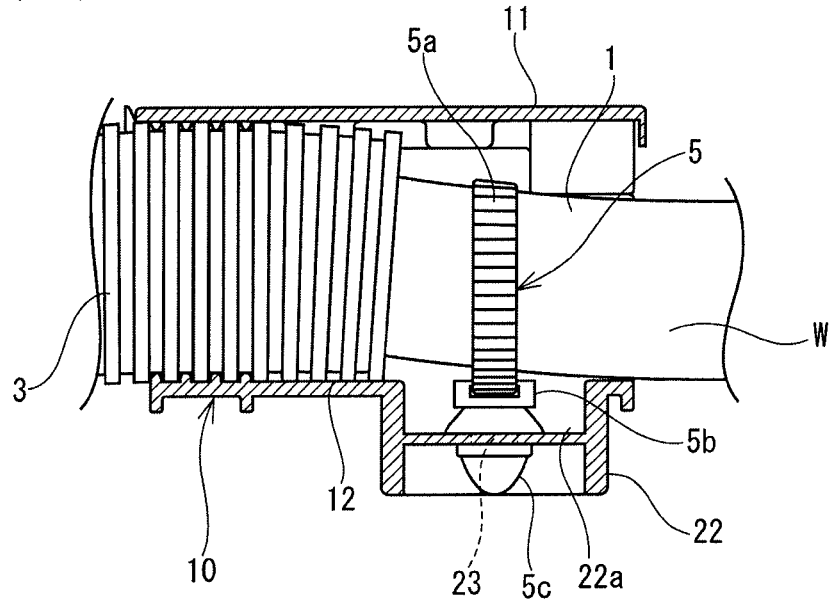
[FIG. 4] (A) A vertical-sectional view of a state in which the wire harness inserted through the main body of the protector. (B) A cross-sectional view of a state in which a band clip is attached to the wire harness.
Figure 4:
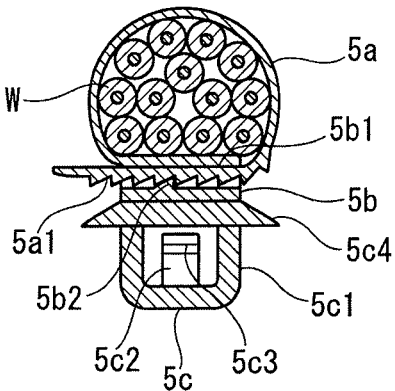

As shown in FIG. 2, the protector 2 is configured with a main body 10 and a lid 11. The main body 10 shown in FIG. 2(A) includes a bottom wall 12, two side walls 13A and 13B protruding from both ends in a width direction of the bottom wall 12, and a dividing wall 14 in the middle. A bracket 15 protrudes from an outer surface of the side wall 13B to be fixated to other members. The bracket 15 is provided with a latching clip 16 and a lock 17. A wire harness insertion path 18 is defined between the side wall 13A and the dividing wall 14. One end in the length direction of the wire harness insertion path 18 is the inlet 2a, and the other end is the outlet 2b. A splice housing 19 is defined between the dividing wall 14 and the side wall 13B. One end of the splice housing 19 is provided with a closed wall 19a, and the other end is an opening 19b for splice insertion. A width of the wire harness insertion path 18 is set to be wide, and at least twice a width of the splice housing 19.

On the inlet 2a side of the wire harness insertion path 18, a convoluted conduit engagement portion 20 is provided on internal surfaces of the bottom wall 12, the side wall 13A, and the dividing wall 14. The convoluted conduit engagement portion 20 has four protruding U-shaped ribs 21 in an axis direction extending from an upper end of the side wall 13A to an upper end of the dividing wall 14. The ribs 21 are each in a circular arc shape having a diameter that precisely fits troughs 45 of the large-diameter convoluted conduit 3L and have a relatively low protrusion height. A pitch for crests and troughs of the convoluted conduit 3 is substantially the same regardless of a diameter of the convoluted conduit 3. Accordingly, the pitch for the troughs 45 and crests 46 of the large-diameter convoluted conduit 3L and the pitch for troughs 40 and crests 41 of the small-diameter convoluted conduit 3S are the same. In addition, the pitch for the ribs 21 provided to the main body 10 is also the same, which is a fixed pitch P.

Between the outlet 2b and the central position in the length direction of the wire harness insertion path 18, a large, circular downward protrusion 22 for clip latching is provided on the bottom wall 12. Further, a recess 22a is provided so as to recess from the bottom wall 12. In the center of the recess 22a, a clip latching hole 23 is pierced.

As described above, in the wire harness 1 on the outlet 2b side inside the protector 2, a plurality of wires W are bound by the band clip 5. The band clip 5 is a resin article formed by integrally molding a band 5a to be wrapped around the plurality of wires W, a main body 5b having the band 5a protruding therefrom and a hole through which the band passes, and a blade-shaped latching portion 5c (clip) protruding from a lower surface of the main body 5b, as shown in FIG. 4(B). After being wrapped around the plurality of wires W, the band 5a is inserted into a through hole 5b1 of the main body 5b. Latching piece 5b2 protruding from an internal surface to the through hole 5b1 is latched onto a latching groove Sal provided to the band 5a so that the plurality of wires W are constricted and fixated. In the blade-shaped latching portion 5c, a shaft 5c1 protrudes from a center of a plate 5c4 protruding from the main body 5b. A latching step 5c3 is provided to a distal end of a blade 5c2 that is provided to a distal end of the shaft 5c1 in a bent-back state. After the blade-shaped latching portion 5c is inserted into the clip latching hole 23, the latching step 5c3 is latched and fixated onto a peripheral edge of the clip latching hole 23.

When attached to the wire harness 1, the band clip 5 protrudes from the bottom wall 12 of the protector main body by the height of the main body 5b of the band clip 5. Accordingly, an upper surface of the wire harness 1 facing the lid 11 side becomes higher, and thus, it becomes difficult to close the lid 11 when the wire harness 1 has a large diameter. Therefore, the band clip main body 5b is inserted into an interior of the downward protrusion 22 provided to the bottom wall 12, and thereby, the height of the upper surface of the wire harness 1 is reduced.

Locking frames 25 that join and lock the lid 11 are provided to both ends in the length direction of outer surfaces of the two side walls 13A and 13B of the main body 10 of the protector 2. In other words, the locking frames 25 protrude from four corners of the main body 10.

The lid 11 of the protector 2 has a wide width, which is the same width as that of the main body 10. The lid 11 is capable of sealing both the wire harness insertion path 18 and the splice housing 19 in the main body 10 with an upper wall 30. Side walls 31 having a low height are provided to both side edges in the width direction of the upper wall 30. Locking pieces 26 that are inserted and locked in the locking frames 25 protrude from both sides in the length direction of both the side walls 31. The locking pieces 26 of the lid 11 and the locking frames 25 of the main body 10 are provided in positions in which they can lock in each other even when the lid 11 is rotated by 180 degrees as shown in FIG. 2(B).

A large-diameter convoluted conduit engagement portion 33 and a small-diameter convoluted conduit engagement portion 35 protrude from diagonal positions and from each side in the length direction of a lower surface of the upper wall 30 of the lid 11 of the protector 2. The large-diameter convoluted conduit engagement portion 33 is configured with four circular arc-shaped ribs 34 each having a diameter and a height that fit the troughs 45 of the large-diameter convoluted conduit 3L. The small-diameter convoluted conduit engagement portion 35 is configured with four circular arc-shaped ribs 36 each having a diameter and a height that fit the troughs 40 of the small-diameter convoluted conduit 3S.

Figure 5:
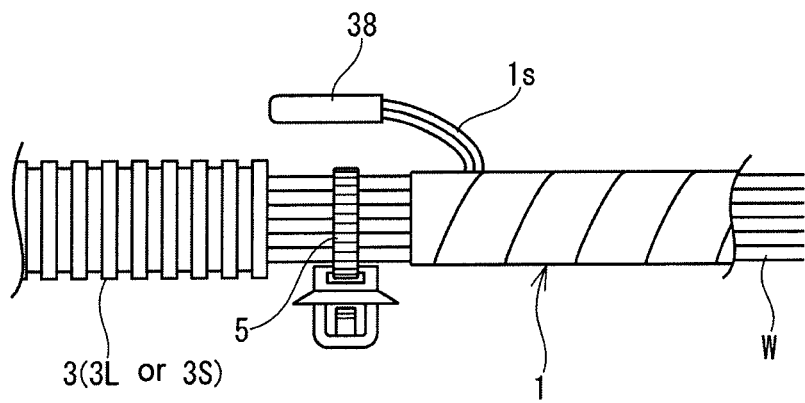
[FIG. 5] A figure showing a wire harness to be inserted into the protector.
Figure 6:
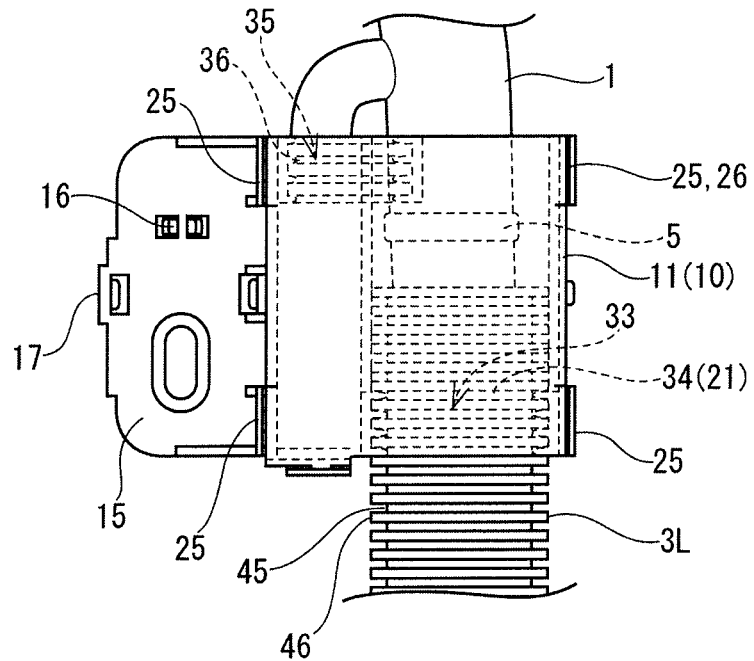
[FIG. 6] (A) A plan view showing a state in which the wire harness covered by a large-diameter convoluted conduit is inserted into the protector. (B) A plan view showing a state in which the wire harness covered by a small-diameter convoluted conduit is inserted into the protector.
Figure 6:
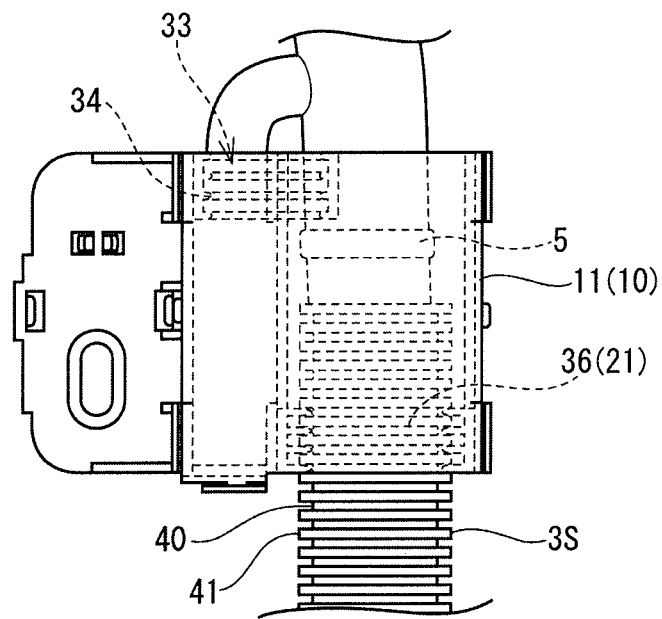

In the following, mounting of the wire harness 1, shown in FIG. 5, on the protector 2 having the main body 10 and the lid 11 in the above-described shape is described. In the wire harness 1 that is inserted through the protector 2, a branch line 1s having a splice 38 is branched off from a trunk line. Further, the wire harness 1 is pre-bound by the band clip 5 at a predetermined position.

As shown in FIG. 6(A), in a case where a convoluted conduit covering the wire harness 1 that is inserted into the inlet 2a of the protector 2 is the large-diameter convoluted conduit 3L, the ribs 21 of the main body 10 are first inserted into the troughs 45 for positioning. Further, the blade-shaped latching portion 5c of the band clip 5 fastening the wire harness 1 is inserted into and latched onto the clip latching hole 23. Next, the lid 11 is placed such that the large-diameter convoluted conduit engagement portion 33 is on the inlet 2a side of the main body 10 and above the convoluted conduit engagement portion 20 of the main body 10; and the ribs 34 are then inserted into the upper surface side of the large-diameter convoluted conduit 3L. Thereby, the ribs 34 and 21 are inserted into upper and lower sides, respectively, of the troughs 45 of the large-diameter convoluted conduit 3L. Accordingly, the large-diameter convoluted conduit 3L can be positioned and held between the main body 10 and the lid 11 while being prevented from shifting in the axial direction. In such a state, the locking pieces 26 of the lid 11 are inserted and locked in the locking frames 25 of the main body 10 in order to fixate the main body 10 and the lid 11 to each other. Furthermore, the branch line 1s branched off from the wire harness 1 and having the splice 38 is branched off from the trunk line of the wire harness 1. The splice 38 is inserted into the splice housing 19.

As shown in FIG. 6(B), in a case where a convoluted conduit covering the wire harness 1 is the small-diameter convoluted conduit 3S, the ribs 21 of the convoluted conduit engagement portion 20 of the main body 10 are inserted into the troughs 40 of the small-diameter convoluted conduit 3S. At that point, a central portion of each rib 21 protruding from the bottom wall 12 is inserted into the troughs 40 of the small-diameter convoluted conduit 3S while upper sides of both side portions of the ribs 21 are off the troughs 40. The band clip 5 that is pre-bound on the wire harness 1 is inserted into and latched onto the clip latching hole 23 of the bottom wall 12.

Then, the lid 11 is placed such that the small-diameter convoluted conduit engagement portion 35 is positioned on the inlet 2a side and faces the convoluted conduit engagement portion 20 of the main body 10 from above. In other words, the lid 11 is rotated by 180 degrees from the situation of the large-diameter convoluted conduit and is mounted on the main body 10. The ribs 36 of the small-diameter convoluted conduit engagement portion 35 of the lid 11 are accurately inserted into an upper surface side of the troughs 40 of the small-diameter convoluted conduit 3S. With the ribs 36 being inserted into and pressing down the troughs 40 on the upper surface side of the small-diameter convoluted conduit 3S in such a way, the ribs 21 on the main body 10 side engage with the troughs 40 without position drift. Thereby, the small-diameter convoluted conduit 3S is positioned and held in the protector 2. Thereafter, the locking pieces 26 of the lid 11 are inserted into and latched onto the locking frames 25 of the main body 10 for lock connection. The locking pieces 26 and the locking frames 25 are provided in positions where the locking pieces 26 can be inserted into and latched onto the locking frames 25 even when rotated by 180 degrees, which enables lock connection without difficulty.

In the present embodiment, the large-diameter convoluted conduit 3L is ø32 mm, and the small-diameter convoluted conduit 3S is ø28 mm.

As described above, in the above-described embodiment of the present invention, one type of the protector 2 configured with one main body 10 and one lid 11 can be used to accommodate different sizes, large and small, of convoluted conduit covering the wire harness. Therefore, it is not necessary to increase the types of the protectors based on the difference in diameters of the wire harness.

Figure 7:
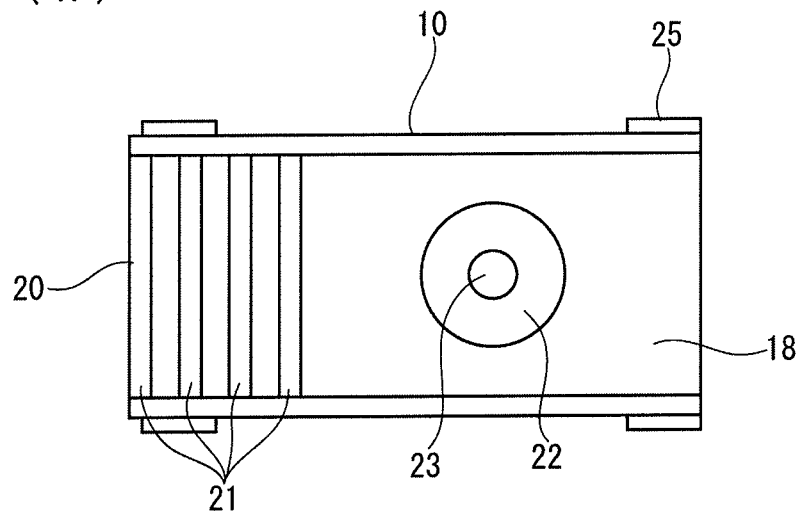
[FIG. 7] Figures showing a protector according to a second embodiment. (A) A schematic plan view of a main body. (B) A schematic bottom view of a lid.
Figure 7:
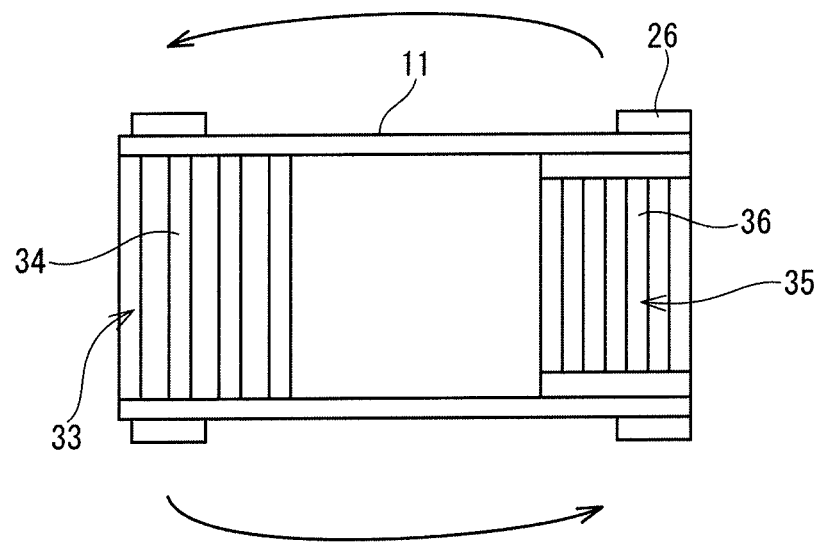
Figure 8:
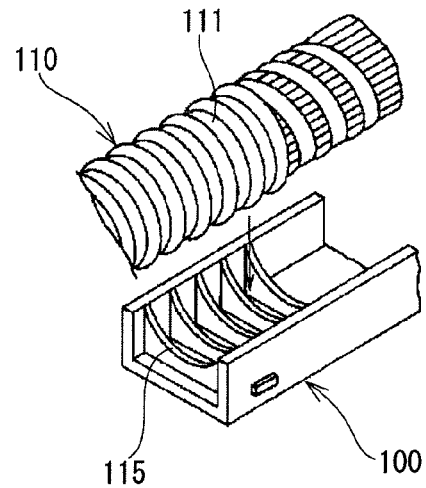
[FIG. 8] A perspective view of an example of conventional art.
Figure 9:
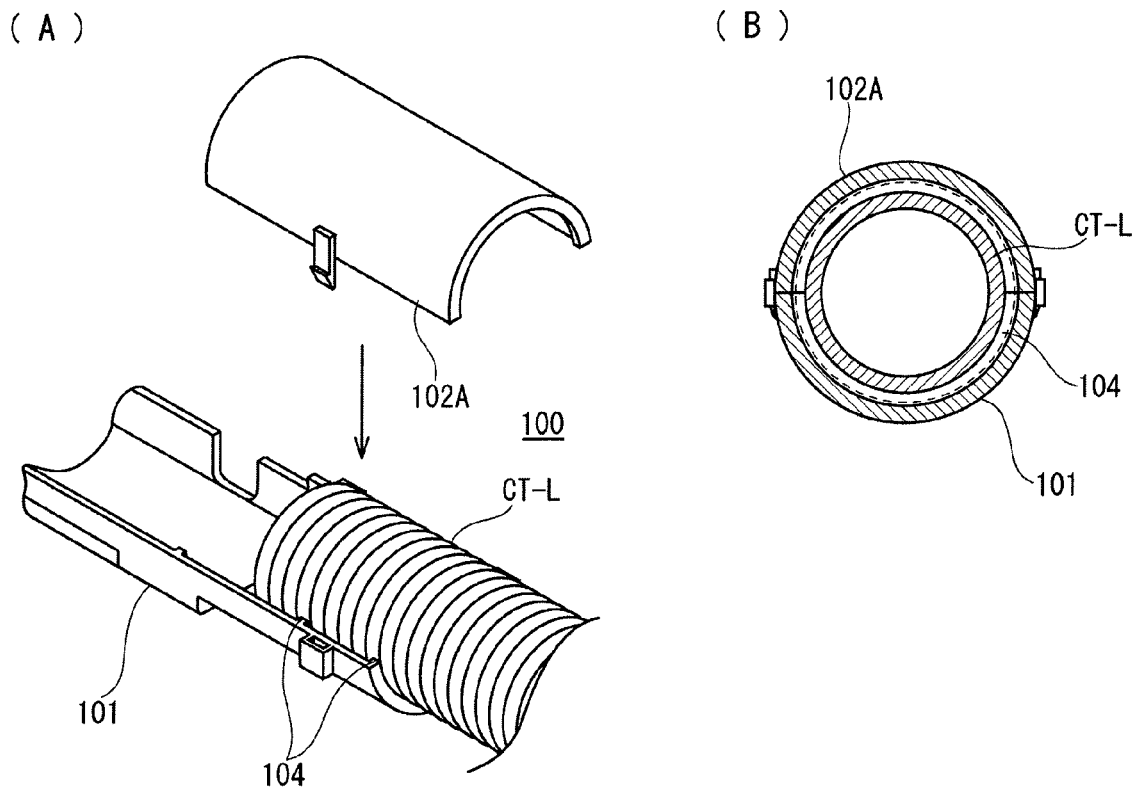
[FIG. 9] (A) (B) Figures showing a case where a large-diameter convoluted conduit is inserted into a protector of another example of conventional art.
Figure 10:
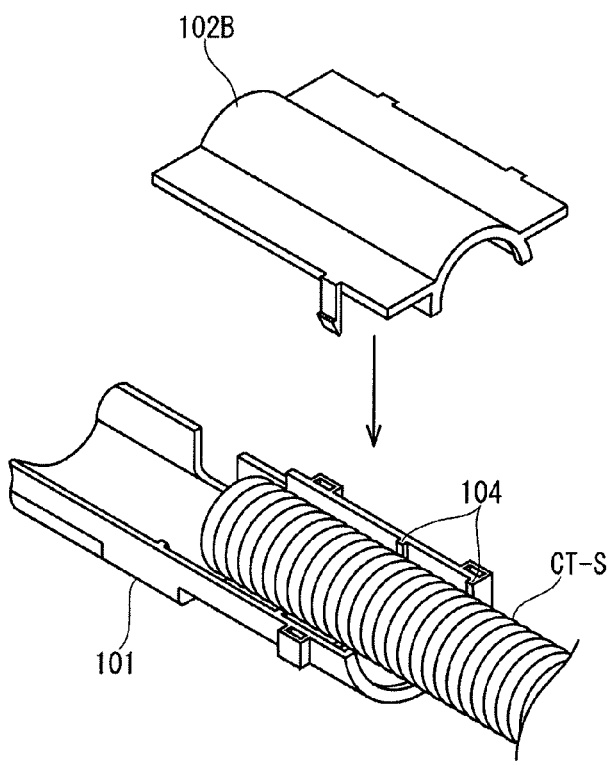
[FIG. 10] (A) (B) Figures showing a case where a small-diameter convoluted conduit is inserted into the protector of FIG. 9.
Figure 10:
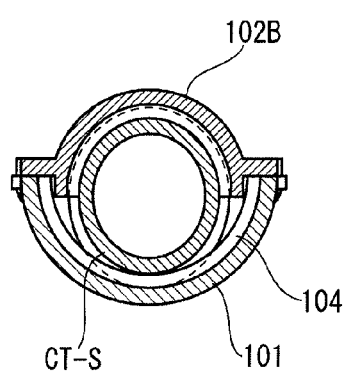

FIG. 7 illustrates a second embodiment. A protector of the second embodiment does not include a splice housing but includes only the wire harness insertion path 18 in the main body 10 that has a relatively long trench shape. The lid 11 has an oblong shape in accordance with the main body 10 and includes a large-diameter convoluted conduit engagement portion 33 and a small-diameter convoluted conduit engagement portion 35 on each side opposite to each other, not in a diagonal direction, but in a length direction. Other components are similar to the first embodiment. Thus, those components are provided with the same reference signs, and description thereof is omitted.

Further, when four types of convoluted conduits having ø24, 28, 32, and 36, respectively, are selectively used according to a diameter of a wire harness, two types of lids, a lid having convoluted conduit engagement portions for ø24 and 28 on each side, respectively, and a lid having convoluted conduit engagement portions for ø32 and 36 on each side, respectively, may be provided.

Moreover, it is not required to fasten a wire harness inserted into the protector with a band clip and to latch a clip of the band clip onto a latching hole provided to a bottom wall of a main body. A wire harness pulled out from an outlet of the protector may be fixated by tape-winding onto a tape-winding piece provided to the outlet. In addition, instead of a band clip that fasten a wire harness, a board-type clip may be used which fixates a wire harness on a board by tape-winding.

REFERENCE SIGNS LIST

1: Wire harness
2: Protector
2a: Inlet
2b: Outlet
3: Convoluted conduit
3L: Large-diameter convoluted conduit
3S: Small-diameter convoluted conduit
5: Band clip
10: Main body
11: Lid
12: Bottom wall
13A, 13B: Two side walls
14: Dividing wall
18: Wire harness insertion path
19: Splice housing
20: Convoluted conduit engagement portion
21: Rib
23: Clip latching hole
30: Upper Wall
33: Large-diameter convoluted conduit engagement portion
35: Small-diameter convoluted conduit engagement portion
34, 36: Rib

The invention claimed is:

1. A protector that positions and holds, on an insertion inlet side, a convoluted conduit covering a wire harness, comprising:
   a main body having a bottom wall and two side walls;
   a lid provided separately from the main body and covering an upper surface opening of the main body;
   locks capable of mutually connecting the main body and the lid provided on both sides in a length direction of each of the main body and the lid, the locks of the lid being provided in symmetrical positions to enable connection with the locks of the main body when the lid is rotated by 180 degrees;
   a convoluted conduit engagement portion having ribs that fit troughs of a large-diameter convoluted conduit extending from the bottom wall on one end side in the length direction of the main body to internal surfaces of the two side walls;
   a large-diameter convoluted conduit engagement portion having ribs that fit the troughs of the large-diameter convoluted conduit provided on an internal surface on one end side in the length direction of the lid, and a small-diameter convoluted conduit engagement portion having ribs that fit troughs of a small-diameter convoluted conduit provided on an internal surface on the other end side; wherein
   the convoluted conduit engagement portions on both the main body side and the lid side include a plurality of ribs having the same pitch and allow the lid to be rotated by 180 degrees to correspond to an outer diameter of an inserted convoluted conduit and to connect to the main body.

2. The protector according to claim 1, wherein
   the wire harness covered by the protector is inserted through the convoluted conduit on one end side of the protector and the wire harness on the other end side is bound by a band clip without being inserted through the convoluted conduit;
   a recess for the band clip is provided in the bottom wall of the main body of the protector; and
   a clip latching hole is provided in the center of the recess.

3. The protector according to claim 2 wherein
   a dividing wall is provided in the length direction in the middle of a width direction of the main body;
   a wire harness insertion path is provided on one side divided by the dividing wall;
   the ribs are provided on the internal surface on one end side of the wire harness insertion path to define the convoluted conduit engagement portion;
   a splice housing is provided on the other side of the dividing wall;
   a width of the lid corresponds to a width of the main body; and
   the large-diameter convoluted conduit engagement portion and the small-diameter convoluted conduit engagement portion are diagonally positioned.

4. The protector according to claim 1, wherein
   a dividing wall is provided in the length direction in the middle of a width direction of the main body;
   a wire harness insertion path is provided on one side divided by the dividing wall;
   the ribs are provided on the internal surface on one end side of the wire harness insertion path to define the convoluted conduit engagement portion;
   a splice housing is provided on the other side of the dividing wall;
   a width of the lid corresponds to a width of the main body; and
   the large-diameter convoluted conduit engagement portion and the small-diameter convoluted conduit engagement portion are diagonally positioned.

5. The protector according to claim 1, wherein the large-diameter convoluted conduit engagement portion and the small-diameter convoluted conduit engagement portion are diagonally positioned such that the large-diameter convoluted conduit engagement portion and the small-diameter convoluted conduit engagement portion partially overlap with each other in a width direction of the lid.

6. The protector according to claim 1, wherein an upper surface of the lid is defined by a planar surface.

* * * * *